United States Patent [19]
Voit et al.

[11] Patent Number: 5,805,682
[45] Date of Patent: Sep. 8, 1998

[54] METHOD FOR DELIVERING CALL RELATED INFORMATION TO A VIDEO DISPLAY

[75] Inventors: Eric A. Voit, Baltimore; Larry W. Sours, Crofton; Lance S. Liptak, Laytonsville, all of Md.; Kenneth E. DePaul, Wake Forest, N.C.

[73] Assignee: Bell Atlantic Network Services, Inc., Arlington, Va.

[21] Appl. No.: 564,964

[22] Filed: Nov. 30, 1995

[51] Int. Cl.⁶ .............................. H04M 1/56; H04M 15/06
[52] U.S. Cl. ...................... 379/142; 379/93.14; 379/93.1; 379/219; 379/207; 348/6; 348/7; 348/12; 348/13; 455/5.1; 455/4.2; 455/6.2
[58] Field of Search ............................. 379/34, 112–115, 379/122, 207, 219, 142, 93.14, 230, 90.1, 93.1, 220, 221, 229; 348/12–13, 6–7, 14, 16; 455/5.1–6.1, 4.2, 6.2

[56] References Cited

U.S. PATENT DOCUMENTS

| | | |
|---|---|---|
| 4,150,254 | 4/1979 | Schussler . |
| 4,161,728 | 7/1979 | Insam . |
| 4,560,833 | 12/1985 | Weber et al. . |
| 4,611,094 | 9/1986 | Asmuth et al. ..................... 179/7.1 TP |
| 4,611,095 | 9/1986 | Asmuth et al. . |
| 4,751,578 | 6/1988 | Reiter et al. . |
| 4,763,191 | 8/1988 | Gordon et al. . |
| 4,866,758 | 9/1989 | Heinzelmann . |
| 4,890,321 | 12/1989 | Seth-Smith et al. . |
| 4,890,322 | 12/1989 | Russell, Jr. . |
| 4,893,326 | 1/1990 | Duran et al. . |
| 5,054,055 | 10/1991 | Hanle et al. . |

(List continued on next page.)

FOREIGN PATENT DOCUMENTS

WO93/01685  1/1993  WIPO .

OTHER PUBLICATIONS

Berman et al, "Perspectives on the AIN Architecture", IEEE Communications Magazine, Feb. 1992, pp. 27–32.
"The SPACE system: A new dimension in service creation", Bellcore Exchange, Jan./Feb. 1992, pp. 8–13.
"Turning concepts into reality with the SPACE system", Bellcore Exchange, May/Jun. 1992, pp. 25–28.
"Introduction to Bellcore's Integrated Service Control Point Software", Bellcore, 1992, pp. 1–8.

*Primary Examiner*—Curtis A. Kuntz
*Assistant Examiner*—Duc Nguyen
*Attorney, Agent, or Firm*—McDermott, Will & Emery

[57] ABSTRACT

An advanced intelligent network (AIN) comprises an services control point providing fully integrated service logic for both narrowband and broadband communications. When a terminating trigger event of a switch on the phone number of the line serving a customer detects an incoming telephone call, the switch sends a query to the services control point with the calling number of the incoming call. The services control point retrieves calling party information corresponding to the calling number directly from a line identification database and issues a send data transaction with the retrieved calling party information to the customer's set-top box. The calling party information is then displayed on the customer's video display.

19 Claims, 9 Drawing Sheets

U.S. PATENT DOCUMENTS

| | | |
|---|---|---|
| 5,241,588 | 8/1993 | Babson et al. . |
| 5,247,347 | 9/1993 | Litteral et al. . |
| 5,262,860 | 11/1993 | Fitzpatrick et al. . |
| 5,278,889 | 1/1994 | Papanicolaou et al. . |
| 5,325,419 | 6/1994 | Connolly et al. . |
| 5,327,554 | 7/1994 | Palazzi, III et al. . |
| 5,329,308 | 7/1994 | Binns et al. . |
| 5,349,638 | 9/1994 | Pitroda et al. . |
| 5,526,034 | 6/1996 | Hoarty et al. . |
| 5,541,917 | 7/1996 | Farris . |
| 5,563,939 | 10/1996 | La Porta et al. . |
| 5,566,231 | 10/1996 | Sizer, II . |
| 5,566,232 | 10/1996 | Sizer, II . |
| 5,570,295 | 10/1996 | Isenerg et al. . |
| 5,570,420 | 10/1996 | Bress et al. . |
| 5,574,779 | 11/1996 | Ely et al. . |
| 5,583,864 | 12/1996 | Lightfoot et al. . |
| 5,583,914 | 12/1996 | Chang et al. . |
| 5,583,920 | 12/1996 | Wheeler, Jr. ............................ 379/112 |
| 5,583,927 | 12/1996 | Ely et al. ................................ 379/207 |
| 5,586,177 | 12/1996 | Farris et al. . |
| 5,592,477 | 1/1997 | Farris et al. . |
| 5,592,530 | 1/1997 | Brockman et al. ....................... 379/34 |
| 5,594,789 | 1/1997 | Seazholtz et al. ...................... 379/207 |
| 5,608,447 | 3/1997 | Farry et al. . |
| 5,621,728 | 4/1997 | Lightfoot et al. . |
| 5,623,491 | 4/1997 | Skoog . |
| 5,629,978 | 5/1997 | Blumhardt et al. . |

METHOD FOR DELIVERING CALL RELATED INFORMATION TO A VIDEO DISPLAY

FIELD OF THE INVENTION

This invention relates generally to the integrated processing of narrowband and broadband communications in an advanced intelligent network (AIN). In particular, the present invention relates to the coordinating and integrating of narrowband calls into broadband video networks using AIN functions.

BACKGROUND OF THE INVENTION

Caller ID is a widely implemented service in the public switched telephone network. In the typical Caller ID service, information identifying the originating telephone number, the name of the originating party and/or the time of a telephone call is included in the call when it is sent over the telephone network to the called party's premises. An appropriate device at the called party's premises detects the information and displays it while the called party's telephone is ringing. The called party then has an opportunity to see the number and/or name of the originating party and to decide whether or not to pick up their phone. If the called party picks up their phone or if an answering machine or other device accepts the call, the call connection is then completed in a conventional manner. If the called party does not answer the phone, the call is not completed. But in any event, the Caller ID information can be detected and recorded at the called party's premises.

Unfortunately, because the Caller ID information is included within the telephone call itself, the called party's phone must always be allowed to ring before the Caller ID information can be detected, displayed or recorded, resulting in possible inconvenience to the called party. Furthermore, additional equipment is generally required at the called party's premises to detect the Caller ID information on the telephone line, thereby increasing the cost and inconvenience of the service.

There have been efforts to ameliorate some of the disadvantages inherent in the necessity to have additional equipment at the called party's premises in order to detect, display and record the Caller ID information. See, for example, U.S. Pat. No. 5,054,055 to Hanle et al and U.S Pat. No. 4,866,758 to Heinzelmann which appear to discuss using a computer, primarily having other uses, to perform the function of detecting the Caller ID from the incoming phone call. Nevertheless, the computer must be connected to the telephone line over which the telephone call is sent so that it receives the narrowband call when the call "rings" at the called party's premises. It also appears that the called party could not use their computer for some other functions, such as retrieve information online, which would occupy the same telephone line used for telephone calls to the called party's premises.

Systems for delivering auxiliary information within broadband video distribution networks are known. Much auxiliary information transferred in broadband video networks usually relates to the delivery, distribution or decoding of the video. See, for example, U.S. Pat. No. 4,890,322 to Russell, Jr. or U.S. Pat. No. 4,893,326 to Duran et al. There are various video systems in which teletext or other information not related to the video is imbedded in the video and sent for display on a standard television screen. See, for example, U.S. Pat. No. 4,890,321 to Seth-Smith et al, U.S. Pat. No. 4,161,728 to Insam and U.S. Pat. No. 4,751,578 to Reiter et al, and U.S. Pat. No. 5,327,554 to Palazzi III et al. However, in such video systems, the textual information is not related to, and is not derived from, an incoming telephone call. Although U.S. Pat. No. 4,150,254 to Schussler obtains textual information transmitted over telephone lines, the transmitted information received and displayed apparently is not related to the telephone call and is not information such as that received in a Caller ID service.

In those instances where call related information is sent in a video environment, it appears that it is sent as part of a video telephone connection to identify the party initiating the video telephone connection rather than from an incoming telephone call to the same customer over separate telephone lines. See, for example, U.S. Pat. No. 4,560,833 to Weber et al, U.S Pat. No. 5,278,889 to Papanicolaou et al and U.S. Pat. No. 5,329,308 to Binns et al.

Consequently, there is believed to be a need to provide an advantageous method in which information related to an incoming telephone call, such as caller ID information, can be delivered for display on a convenient video display, such as a television set, without said display having to directly connect to the telephone line on which said telephone call is sent and detect said information at the called party's premises.

Enhanced telephone networks, frequently referred to as advanced intelligent networks (AIN), provide network operators with considerable flexibility and economy in structuring their product offerings and providing their customers with numerous telephone conveniences and services. The typical AIN architecture allows the switched transport network to interact with database systems and other peripherals for obtaining information, data and support operations. This occurs when the switching network is triggered to access the database or peripheral by some condition that arises when a telephone call is being processed. An AIN trigger will typically arise in an AIN-equipped switch, and that will cause the switch to refer to a database for information or service to support processing of the call. AIN databases are typically accessed via a common channel signaling system —a separate network used for out-of-band signaling.

In an AIN type system, local and/or toll offices of the public telephone network detect one of a number of call processing events identified as AIN "triggers". For ordinary telephone service calls, there would be no event to trigger AIN processing; and the local and toll office switches would function normally and process such calls without referring to the central database for instructions. An office which detects a trigger will suspend call processing, compile a call data message and forward that message via a common channel interoffice signalling (CCIS) link to a services control point which includes a Multi-Services Application Platform (MSAP) database.

The services control point is essentially a central control for the network. If needed, it can instruct the central office to obtain and forward additional information. Once sufficient information about the call has reached the services control point, it accesses its stored data tables in the MSAP database to translate the received message data into a call control message and returns the call control message to the office of the network via CCIS link. The network offices then use the call control message to route and complete the particular call.

This architectural scheme is the basis for a diversity of network services. AIN techniques are employed by both interexchange and local exchange carriers. For some applications, the attendant common channel signaling systems of multiple carriers have been interconnected so that signaling information can be exchanged for coordinating operations in support of certain telephone services involving both carriers. For example, an interexchange carrier's common channel signaling system and that of a local exchange carrier may be interconnected through a signal transfer point so that signals can be exchanged relative to special service telephone calls involving both carriers, examples of which are such things as "800" calls and calling card calls where number verification is needed.

Concurrent with the recent developments in advanced intelligent networks, several different wideband digital distribution networks have been proposed for offering subscribers an array of video services, including video on demand services. These digital distribution networks have evolved to provide equal access to multiple service providers and a video "dial tone" functionality somewhat analogous to the dial tone call-up functionality available through the telephone network. For example, U.S. Pat. No. 5,247,347 to Litteral et al, which is hereby entirely incorporated by reference, discusses a digital video distribution network providing subscribers with access to multiple service providers through the public switched telephone network.

AIN networks were initially developed to meet the functional needs associated with the provision of voiceband telecommunications services. See, for example, Berman et al., "Perspectives on the AIN Architecture," IEEE Communications Magazine, February 1992, pp. 27–32. No provision was made for broadband communications, such as video dialtone, in these networks and consequently, the ISCP and each of the other elements in the network is a narrowband element used for narrowband services, such as voice communications. Furthermore, even if broadband communications are available in an AIN, the enhanced services implemented by the services control point can not be implemented for the broadband communications.

Although the final drop into the subscriber's home in some video architectures, such as ADSL, is over telephone lines shared between telephone service and video service, known methods and systems make little use of the AIN network's integration with the video capabilities of the existing telephone network. For example, the upstream control signals from a settop box generally are directed to a VIP and relate only to the manner in which the video signals are delivered. The control signals generally are not related to telephone services or to the routing of telephone calls in conjunction with video services.

As AIN services become more prevalent and sophisticated, it has also become desirable to create individual customized services, such as call processing and routing, for each customer. See, for example, U.S. Pat. No. 4,611,094 to Asmuth et al and U.S. Pat. No. 5,241,588 to Babson et al. (See also "The SPACE system: A new dimension in service creation", Bellcore Exchange, January/February 1992, pp. 8–13; and "Turning concepts into reality with the SPACE system", Bellcore Exchange, May/June 1992, pp. 25–28.) However, the Asmuth et al and Babson et al patents only offer a limited number of telephone services and do not disclose customization which includes the option of combining certain telephone services with broadband video services. For example, they do not discuss a telephone service in which call related information is displayed on a video display or telephone calls are blocked during a pay-per-view event.

To date, the AIN telephone network has been a separate technical area of development, with at most limited interaction between the AIN narrowband and broadband video distribution networks. For example, U.S. Pat. No. 4,763,191 to Gordon et al discusses a method for providing a nationwide dial-a-view service in which a caller desiring a given viewing selection dials an INWATS "800" dial-a-view number for ordering that selection through the telephone networking arrangement. A central data base system provides the originating toll office with routing instructions for sending the request to network services equipment. The network services equipment acknowledges the caller's request for cable services and processes the dial-a-view request. The network services equipment provides relevant data to cable television distribution equipment to control actual supply of requested programming to the calling subscriber. Separate vendor equipment supplies the requested programming to the calling customer via activation of an addressable decoder at the calling customer's television. The broadband system does not present information relating to calls, such as Caller ID information, to users of the broadband services.

As another example, U.S. Pat. No. 5,278,889 to Papanicolaou et al discusses a two-way video telephone system using a combination of a two-way cable television distribution system and an intelligent voice telephone network. The video distribution networks used apparently are existing frequency division multiplexed analog transmission systems. As part of the disclosed call processing, a central database responds to video telephone call dialing information by providing instructions to the network to route the video portion of the call through a digital inter-exchange carrier network between points of presence of two of the cable television distribution networks.

Concomitant with the advances in AIN technology, significant advances have also been made in the customer premise equipment (CPE) - that apparatus which makes up the terminus equipment between which telecommunications calls are extended through the carrier networks. While CPE may be no more than a simple telephone, it also may be quite complex and include such things as computers interconnected by local area networks (LANs), and other intricate arrangements of terminal equipment and peripheral devices (e.g., facsimile machines, video terminals, databases, and so forth) . In particular, the make-up of CPE is becoming more oriented towards broadband communications, such as video services. The composition of CPE used in a typical residential setting, for example, is changing rapidly as computers are increasingly used in the home, and as such things as video, information, and interactive broadband services "on demand" begin to become commercial realities.

Although the combined advances in intelligent networking and customer premise equipment have together resulted in a very effective telecommunications system, the advances on the two sides have been made somewhat independently and not always with a view as to how the operations of each might be coordinated and integrated with the other for even more effective communications. Known networks make little use of the additional broadband capabilities of modern customer premises equipment.

On the network side, the AIN operations are usually carried out entirely within the boundaries of the network. A telephone call, for example, receives AIN treatment only after it enters the network (the "network" takes diverse forms, of course). Typically, the CPE, whatever its make-up, simply directs a call to the network, and only there does it receive whatever AIN treatment it may provoke within the network. Thus, there is a need for better coordination between the CPE and network operations so that, for any particular service, operations in support of the telecommunications exchanged are carried out in a more seamless and integrated fashion.

More specifically, there is a need for techniques that will allow efficient transport of call related information to a subscriber's CPE, particularly broadband equipment, such as a settop box, to present that information to users engaged in broadband communications.

BRIEF SUMMARY OF THE INVENTION

It is an object of the present invention to provide methods and apparatus which will overcome the disadvantages and meet the needs discussed above.

It is also an object of the present invention to coordinate and integrate narrowband and broadband operations carried out in an AIN network.

It is a further object of the invention to provide for coordination and control of narrowband and broadband communications in an AIN network by using a services control point having one or more interfaces to elements of a broadband network.

It is an object of the present invention to provide an AIN architecture which permits a services control point to interact with the broadband video equipment of a customer receiving a telephone call.

It is also an object of the present invention to provide an AIN network architecture which allows a customer's broadband customer premises equipment to transmit information to the services control point of an AIN telephone network, particularly so that the services control point can, in response, provide instructions to the narrowband network for processing of the narrowband call corresponding to the calling party information displayed on a video display.

It is a further object of the present invention to provide an AIN network architecture which offers integration of narrowband and broadband services, wherein the narrowband switch queries the services control point in response to a telephone call, and the services control point interacts with a subscriber via the subscriber's broadband set-top terminal device prior to instructing the narrowband switch as to how to complete the call.

It is also an object of the present invention to more closely integrate elements of the AIN telephone network and the network providing video communications, particularly for purposes of controlling routing of telephone services in conjunction with the distribution of video, video-on-demand, pay per view and ADSL communications over the dial tone network.

It is a further object of the present invention to provide a telephone network which offers customization of telephone services, enhanced capabilities and other service features, through interactions with the central database, which take into consideration broadband video services such as video-on-demand.

The invention is based upon a realization that numerous advantages would be gained by more closely integrating elements of the AIN telephone network and the video network, particularly for purposes of controlling routing of telephone services to and from the customer premises in conjunction with the distribution of video, video-on-demand, and pay per view.

To achieve these advantages, a preferred embodiment of the invention utilizes the capabilities of an integrated services control point (ISCP) to send call related information of an incoming call on a narrowband network to the bottom of a television screen of the called customer. As in AIN implementations in the narrowband network, the ISCPis adapted or programmed to be responsive to AIN-like trigger events as a telephone call is being processed. Data and signaling links are used to commonly access the ISCP and can be used to provision services and/or set various triggers in the network.

In the preferred embodiment of the invention, when a narrowband switch performing call processing functions detects a terminating attempt trigger on an incoming call, a query is sent to the ISCP with the calling number of the incoming call. The ISCP then queries a line information database to obtain call related information, typically a calling name associated with the calling number. When the ISCP receives the call related information, it identifies the broadband video network address of the set-top box of the called customer through the use of stored internal data. The ISCP issues a send data transaction with call related information to the customer's settop box for display on the screen of the customer's television set.

The method is preferably implemented in an AIN network containing an ISCP and at least one signaling interface between the broadband customer premises equipment and the signaling network of the public switched telephone network. The ISCP can interact with broadband customer premises equipment in any variety of manners. The ISCP may provide service logic for the customer premises equipment and control communications to and from the customer's on-premises broadband equipment. The interactive functionality of the ISCP may be implemented by hardware, by software or by some combination of the two.

The invention makes it possible to deliver call related information to a video dialtone type network merely by leveraging existing investments for a common set of services without having to substantially rebuild the existing infrastructure for narrowband signaling. Since the ISCP is transport independent, the invention is applicable to any video architecture, including, for example, hybrid fiber coax, switched digital video network, digital MMDS, or ADSL. For example, digital MMDS has a very different transport architecture from a switched digital video network or a hybrid fiber coax network. But the needs of signaling and video selection and video setup are somewhat general across all of the architectures. For example, the video has to be selected, the customer records have to be checked, etc. The ISCP of the present invention is able to provide these capabilities across all networks, and in some embodiments using the exact same signaling architecture that would be in place for those networks. Since the ISCP capabilities are reused and integrated into the signaling networks, there can be fast implementation of the method into existing architectures using existing switches and ISCPs.

An interface to the ISCP and/or other databases of the public telephone network may also be provided through software and/or terminal devices maintained on the customer'remises. The software may run on a separate terminal device, such as a set-top box used for video services, or on a suitably programmed personal computer (PC).

When an AIN architecture is employed having both broadband and narrowband networks, the signaling systems of the two are tied together through interfaces to the ISCP that permit the delivery of call related information, associated with a narrowband call, to the broadband video equipment of the called party.

To achieve these advantages, the invention preferably employs a programmable digital entertainment terminal (DET) to interface with the ISCP and one or more switching systems of an AIN network and to provide for the automatic display of text or graphical information on the television screen in response to an incoming telephone call. In a preferred embodiment of the invention, the DET is an enhanced settop box of the type used in cable television or video-on-demand services connected to a television set. The DET communicates with an ISCP of an AIN network through an interface point. Alternatively, the DET may be a general purpose computer, or connected to a general purpose computer, with appropriate interfaces running software offering the ability to communicate with the ISCP and to perform different related enhanced service features, such as voice mail, etc.

Furthermore, the telephone service may include functions which are uniquely advantageous when implemented during the cable television or video-on-demand services provided by the settop box or which are only implemented during the cable television or video-on-demand services provided by the settop box. For example, the customized telephone service may contain screen lists and may block calls during the cable television or video-on-demand services.

The DET can interface with the ISCP over a dial-up connection through the existing telephone communication network, but preferably the DET interfaces with the ISCP over a signalling communication system separate from the broadband communication network.

In any implementation, the present invention addresses the disadvantages in the prior art by utilizing a settop box to perform a variety of functions relating to concurrent telephone and broadband video service, in addition to video signal processing and other functions. The invention advantageously integrates AIN services and video services in a cost-efficient manner at the subscriber's location and improves call routing and switching efficiency through the video dial tone network by altering telephone call switching during a video session through the integrated network.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE PREFERRED EMBODIMENTS

Figure 1:
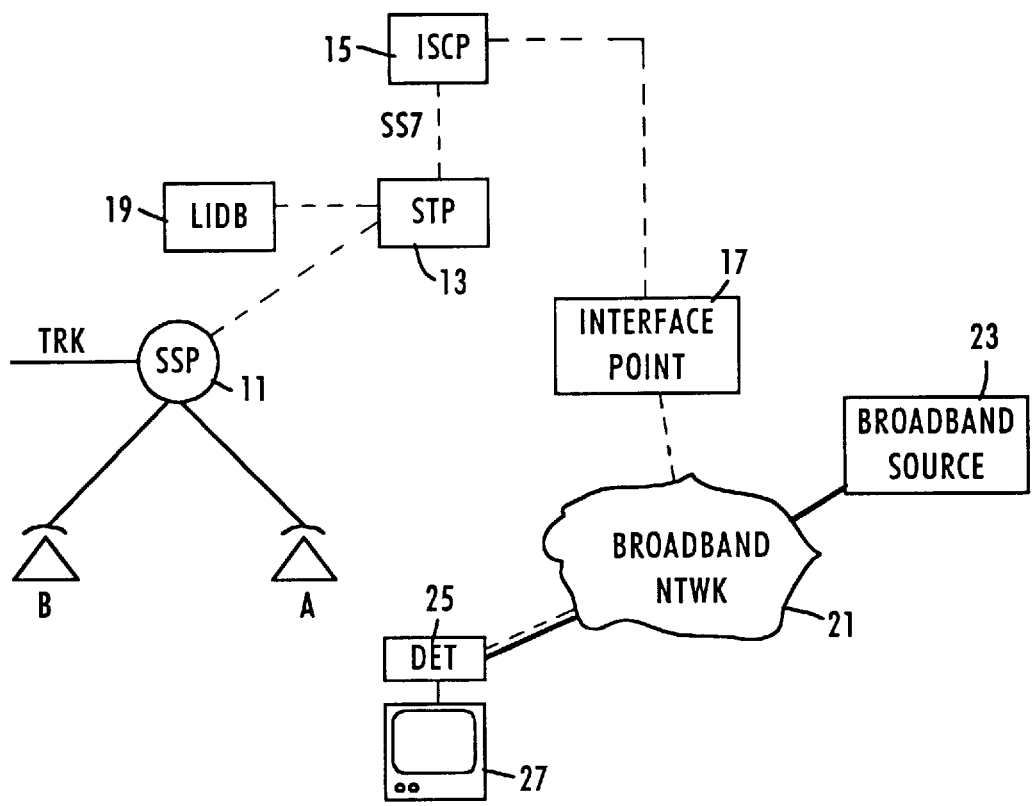
FIG. 1 is a schematic block diagram of a generic advanced intelligent network architecture in which the method for delivering information related to a narrowband call is provided to the called party's broadband video equipment.

FIG. 1 is a schematic block diagram of a generic AIN network providing caller ID through the broadband network as part of the integrated ISCP control of narrowband and broadband communications. The customer premises equipment (CPE) of a first customer, customer A, includes a standard telephone and a television or video display 27 which receives video signals through a settop box. In the example shown in FIG. 1, the settop box is a digital entertainment terminal (DET) 25. DET 25 has a data channel and a signaling channel connected to broadband network 21. Detailed descriptions of a DET interacting with an ISCP may be found in copending application Ser. No 08/250,791 filed on May 27, 1994, entitled "Dynamically Programmable Digital Entertainment Terminal" (Our Ref. 680-083) and Ser. No. 08/504,305 filed on Jul. 20, 1995, entitled "Advanced Intelligent Network Having Digital Entertainment Terminal or the Like Interacting with Integrated Services Control Point" (Our Ref. 680-095), both of which are entirely incorporated by reference into this application as though fully set forth herein.

Although a single broadband source 23 is shown in FIG. 1, the broadband network may have any number of connected sources and end users. Although shown as delivering video information through DET 25, the broadband network may deliver any type of, or any number of types of, broadband information. For example, the broadband network 21 could also transmit digital multimedia information, and the customer premises equipment could include a personal computer and computer monitor instead of, or in addition to, DET 25 and television 27. A Power PC is preferred so that the personal computer matches up with the standard settop boxes. It should also be understood that the broadband network may be of any architecture, using any currently existing or later developed technology.

The broadband network 21 is connected to an ISCP 15 through an interface point 17. In the preferred embodiment of the invention, the services control point is BellCore's Integrated Service Control Point (ISCP) Software system as generally discussed in a 1992 document entitled "An Introduction to Bellcore's Integrated Service Control Point Software" or a revised version thereof, such as Release 2.2. The signaling interface protocol and connection with ISCP 15 may be of any currently existing or later developed signaling interface used in Bellcore's TELEGATE software products or elsewhere. Specific ISCP to broadband network signaling interfaces are discussed below with respect to FIGS. 4–8.

The ISCP 15 also has an SS7 signaling connection to a signal transferring point (STP) 13. A signal switching point (SSP) type central office telephone switching system 11 provides narrowband switching for a large number of connected telephone customers, including customer A connected to broadband network 21, and may accept narrowband information over a trunk line(s) connected to, for example, other SSPs.

Although shown as separate elements in FIG. 1, it should be understood that there may be some physical or virtual connection or relationship between the narrowband network including SSP 11 and STP 13 and broadband network 21. For example, broadband network 21 could receive broadband source information from SSP 11 through a T1 line or other broadband connection, or the DET 25 of customer A could be connected to and receive video information over the same telephone line from SSP 11 providing standard telephone service. Similarly, interface point 17 could be provided in DET 25 by appropriate software resident in the DET.

Figure 3:
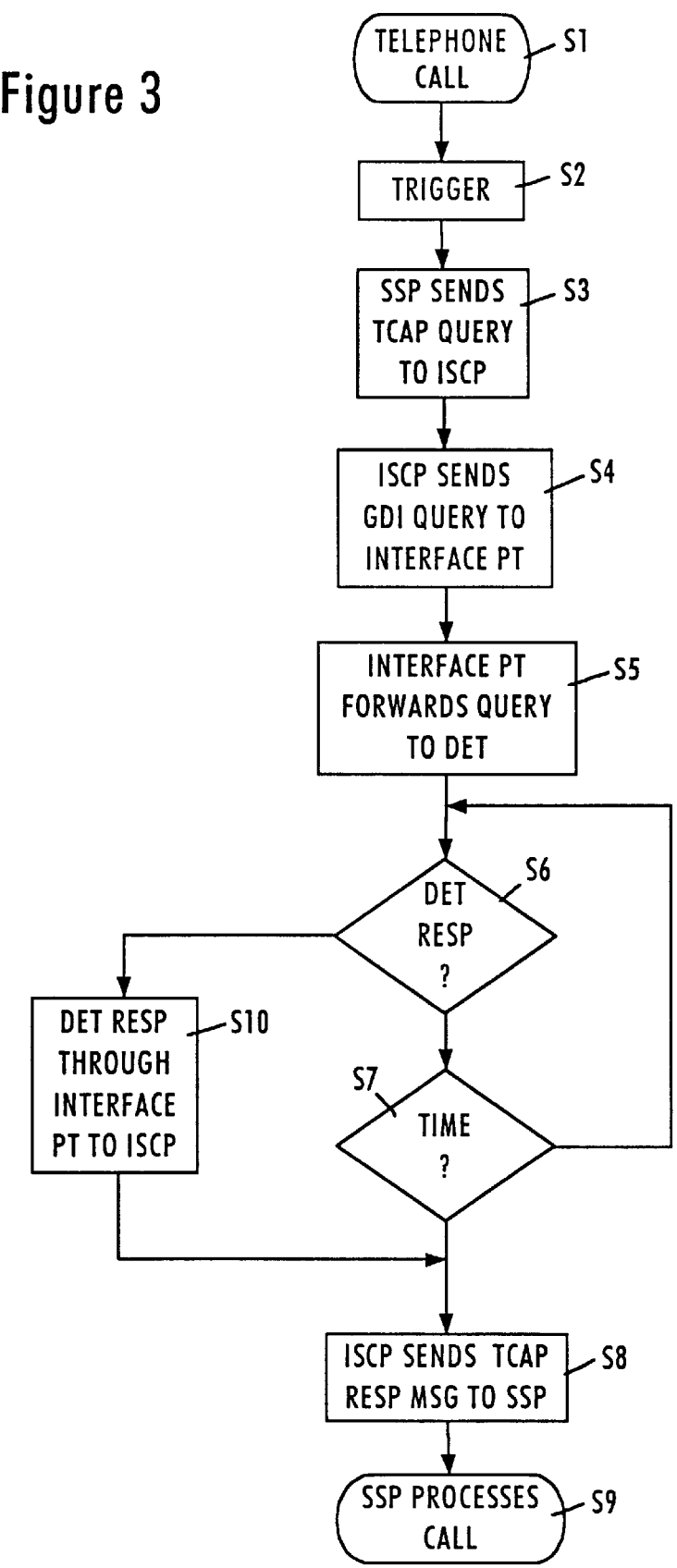
FIG. 3 is a flowchart useful in explaining a method of carrying out the ISCP interactions between narrowband call processing and a broadband network in the generic architecture of FIG. 1.

FIG. 3 shows a method of carrying out the ISCP interactions between narrowband call processing and a broadband network in the generic architecture of FIG. 1. A terminating trigger is set in the customer profile information stored in SSP 11 with respect to the narrowband telephone line of customer A. The trigger is activated whenever somebody makes a telephone call (Step S1) to customer A. When SSP 11 detects a trigger (S2) in response to a telephone call, the SSP 11 composes and sends a TCAP query up to ISCP 15 (Step S3) with the calling number of the incoming call before the telephone call hits and rings on the phone line of customer A.

The terminating trigger detected in Step S2 is independent from the video service. It may be set on all lines or stations, or only on the ones of customers that have the video service, or only on the ones of customers having a video service controlled by a services control point. To avoid unnecessary network traffic, the trigger is preferably set only on the lines of customers that have a video service controlled by a services control point. The trigger may be set and left on or it may be set by the switch when the customer sets up his video service, for example, to watch a movie.

The preferred approach is to leave the trigger on all the time; and either the ISCP 15 is informed as to whether somebody is watching a movie through the DET 24 or the ISCP 15 asks the Level 1 gateway or other element whether the DET is active. The ISCP 15 preferably uses the TELEGATE getData/sendData Interface (GDI), described in Issue 1 of the Bellcore specifications released on May 25, 1993, which is a generic interface for getting and sending data between TELEGATE (and/or other) systems. The data interface is used to send a packet down to interface point 17 that says "send data" to find out the current status (Step S4). Then interface point 17 forwards the query to DET 25 through the broadband network 21 (Step S5). The ISCP 15 then waits to receive a response from the DET 25 through the interface point (Step S10).

Preferably, the DET or other broadband terminating device of the CPE quickly returns an automated response. The query and response may be very simple, such as whether or not a video event is in progress. When the response is received by ISCP 15, it then sends a TCAP response message to the SSP (Step S8) and the SSP processes the narrowband call in accordance with the response message (Step S9).

The status query may be unanswered if the CPE is not on (Step S6) or a certain pre-designated or programmed time period elapses before a response is received (Step S7). The GDI interface process can time out at, e.g., 2, 5, 10, or 15 seconds, so that the narrowband call processing has a default where the call will go to voice mail or it will just ring on the regular telephone. The ISCP can be custom programmed with default service logic for each customer. The ISCP, for example, could route the telephone call in the normal manner or initiate a voice mail type of service. As a further alternative, the ISCP could store information regarding each detected call without a positive response from the DET and give an indication to the customer premises equipment either by an interrupted dialtone or a signaling message displayed across the TV screen the next time the user turns on the DET 25 indicating that the customer has received at least one phone call. The information related to the series of phone calls could be stored in the DET or stored elsewhere with a message sent to the DET indicating that when it is turned on it should retrieve the list. DET 25 may be of a type that is not up and running all the time so long as the signal reception equipment is always running while the DET in the power-down state.

Figure 5A:
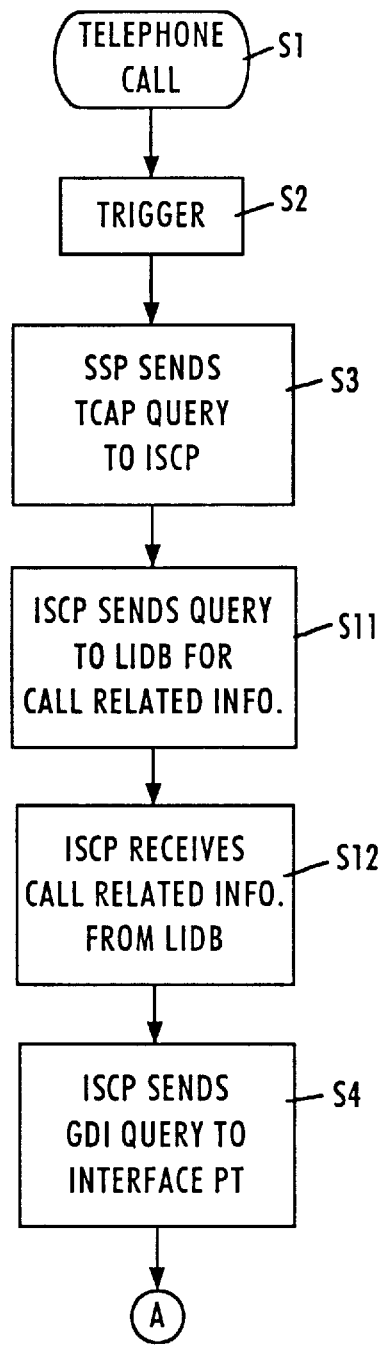
FIGS. 5A and 5B are flowcharts showing major aspects of a method of delivering call related information to a television according to a second embodiment of the invention.
Figure 5B:
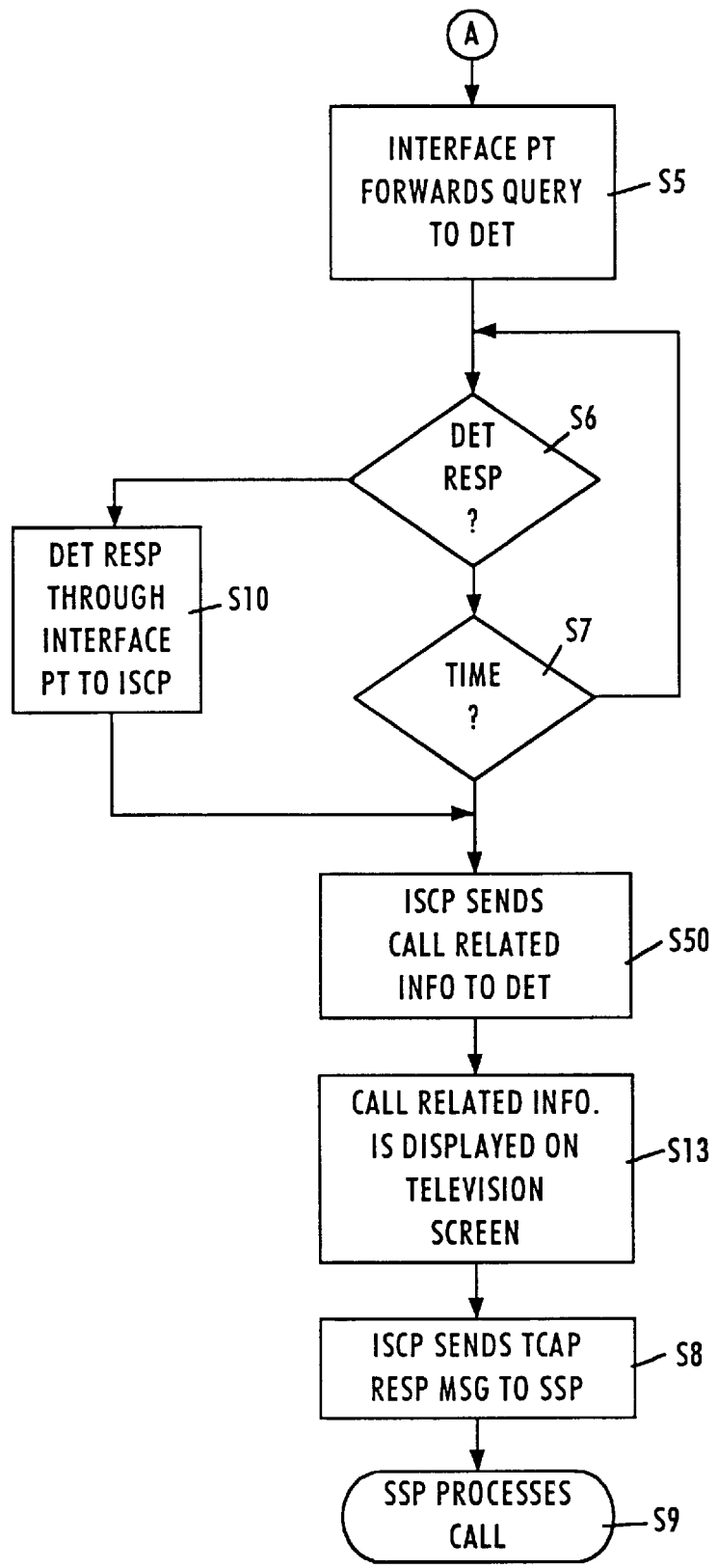

FIGS. 5A and 5B show major aspects of a method of delivering call related information to a television according to a first embodiment of the invention. It starts out with steps S1 to S3 of the general method shown in FIG. 3. In between steps S3 and S4, ISCP 15 queries line information database (LIDB) 19 for call related information based on the calling number. (Step S11) The call related information may contain any information, but preferably comprises at least the calling name corresponding to the calling number so that the call related information is the same information typically provided in a conventional telephone Caller ID service. When LIDB 19 responds to the calling name query (Step S12), the ISCP issues a send data transaction, with the calling name and calling number, to the settop box of customer A identified through the use of stored internal data.

The method of delivering call information then uses the same query process of steps S5 to S7 and S10 used in the general method shown in FIG. 3. But before the ISCP sends the response message to the SSP in step S8, it sends the call related information to the DET (Step S50) and the call related information is displayed on the television screen (Step S13).

The DET preferably formats the query from into a textual Caller ID message and display it at the bottom of the screen on TV 27, before the phone has ever even rung. In this later case, the customer then enters a response into the DET 25 which is forwarded to the ISCP 15 through broadband network 21 and the interface point 17. The response may indicate the customer's preferred disposition of that call.

In an alternative not shown in FIGS. 5A and 5B, the DET (or ISCP) may contain and execute a program containing instructions which instruct the DET to transmit information to the ISCP so that the ISCP can, in response, provide instructions to the narrowband network for call processing of the narrowband call corresponding to the calling party information displayed on the television in step S8. The program could, for example, set the amount of time that the calling party information is displayed on the television before the narrowband call is connected.

Figure 4:
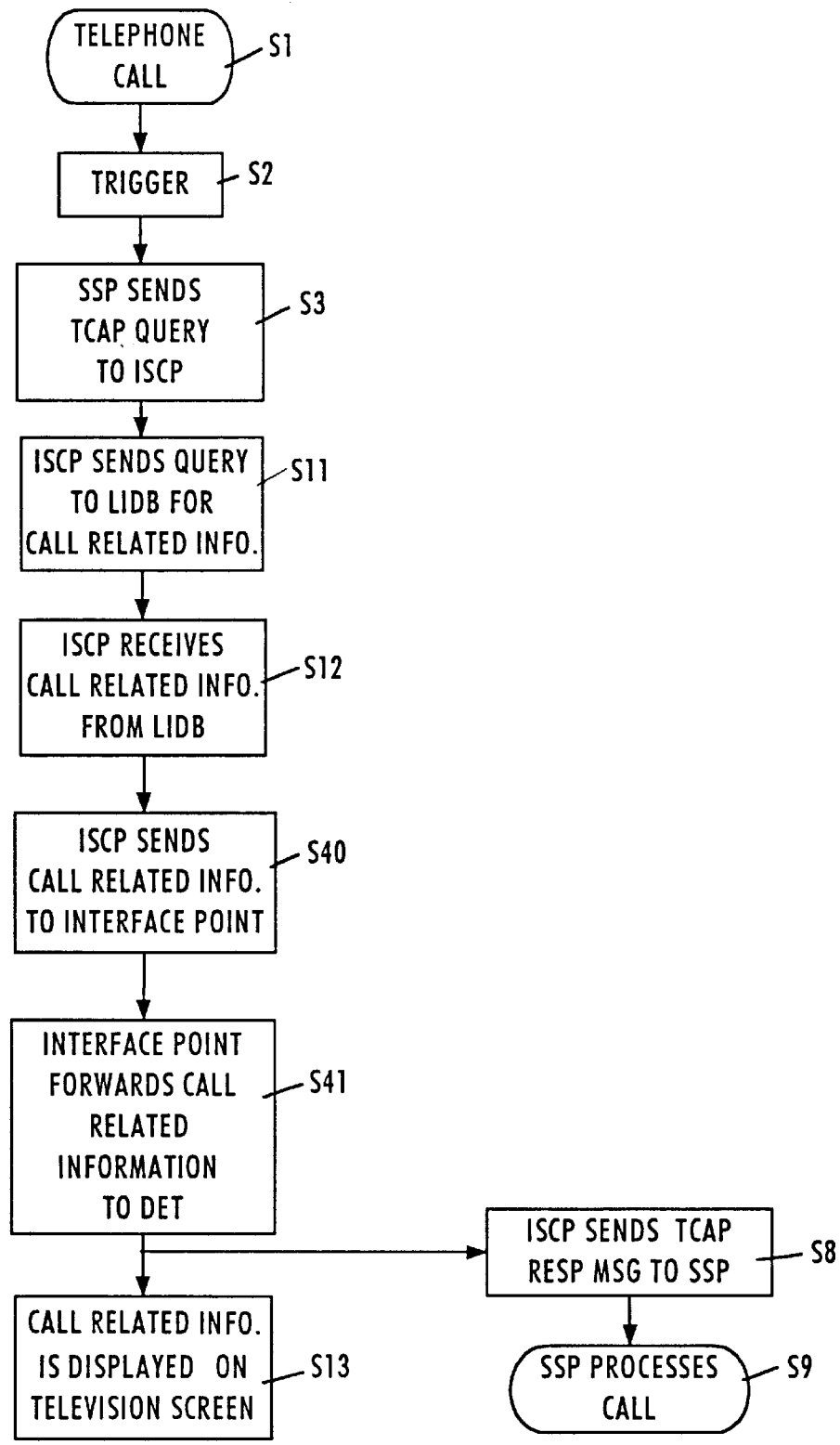
FIG. 4 is a flowchart showing major aspects of a method of delivering call related information to a television according to a first embodiment of the invention.

In a simple alternative embodiment of the invention shown in FIG. 4, steps S1 to S3, S11 and S12 are performed similarly to the embodiment of FIGS. 5A and 5B. But then, instead of querying, the ISCP simply sends the call related information to the interpoint point 17 (Step S40) and interface point 17 forwards the call related information to the DET 25 (Step S41) without waiting for a response from DET 25. If the DET is turned on, the call related information will appear on the television as the phone is ringing (Step S13). If the DET is not turned on, the only consequence is that no information will be displayed. Nevertheless, after step S41, the delivery of the call related information to the television is completed as far as the ISCP is concerned and the ISCP sends a message to SSP 11 to connect the narrowband call (Steps S8 and S9).

The important advantage to both of the embodiments is that the call related information is displayed on the television before the customer's phone rings or the network otherwise terminates the call processing (Step S9). It is also possible that when the query or message appears on the customer's TV set 27, with a remote control, the customer can press a key and send a selectable response back to the ISCP 15. The selectable responses may include the options of, for example, routing the call to voice mail or forwarding it to another predesignated telephone number, even a cellular telephone number. The selectable responses may also include a full destination telephone number, entered in real time by the customer and simultaneously displayed on the screen, to which the call is forwarded. By making a query with the send data GDI query and getting a response, the ISCP 15 can send an appropriate TCAP response message to SSP 11 instructing the switch to forward to any telephone number that can be programmed anywhere in the country (Step S8). This allows call forwarding based on real-time user input from a remote control. The service logic in the ISCP determines what instruction corresponds to the user response.

The terminating attempt trigger used in the method shown in FIG. 3 allows the switch to continue to be part of the processing of the call during the interaction of the user. The length of delay in completing the above steps depends on how the interfacing is set. Of course, the ISCP will time out interacting with the DET at the predefined interval in step S7 if a response is not received back from the user. There is also a time out value between the ISCP and the narrowband switch, at which time the switch may be instructed to play an advertisement, a recording that sounds like ringing or a message to the caller indicating that they should hold. The times on each interface are flexible and can be changed and modified based on user requirements or service requirements.

Methods other than the one shown in FIG. 3 may be used in a network with identical capability and architecture. There may also be an originating trigger in the standard telephone of the CPE so that a query is sent and a text message forwarded down for display on the TV set. The TV user enters a response to indicate their desired processing of the call, and the ISCP sends a message to the switch accordingly.

Any configuration of the basic architecture shown in FIG. 1 is possible and the broadband network architecture is interchangeable as long as the elements of the broadband network can accept a GDI message or other standard interface message and respond with information based on what the customer inputs through the remote control of the DET.

The ISCP can integrate various networks, such as the cellular network and the wireline network. The ISCP has an interface to IS 41 cellular-type signaling as well as the AIN 0.1 message sets for narrowband signaling. The capability of integrating those two different message sets creates cross network services. For example, instead of information related to a conventional telephone call, the method of the present invention could be used to display information related to a cellular phone call or information transmitted in a personal communications service (PCS) on a television. Some services could be performed by using an integrated broadband/cellular/wireline switch, but putting the service logic in the ISCP makes it easy.

Since the ISCP is transport independent, the invention is applicable to any video architecture having addressable settop boxes, including, for example, cable TV, hybrid fiber coax, switched digital video network, multi-channel multi-point distribution systems (MMDS), ADSL or possibly even a direct broadcast satellite (DBS) system. MMDS has a very different transport architecture than a switched digital video network or a hybrid fiber coax network. However, the needs of signaling and video selection and video setup are somewhat general across all of the architectures. For example, the video has to be selected, the customer records have to be checked, etc. The ISCP of the present invention is able to provide these capabilities across all networks, and in some embodiments using the exact same signaling architecture that would be in place for those networks. Since the ISCP capabilities are reused and integrated into the signaling networks, there is fast implementation into existing architectures using switches and live ISCPs.

Figure 2:
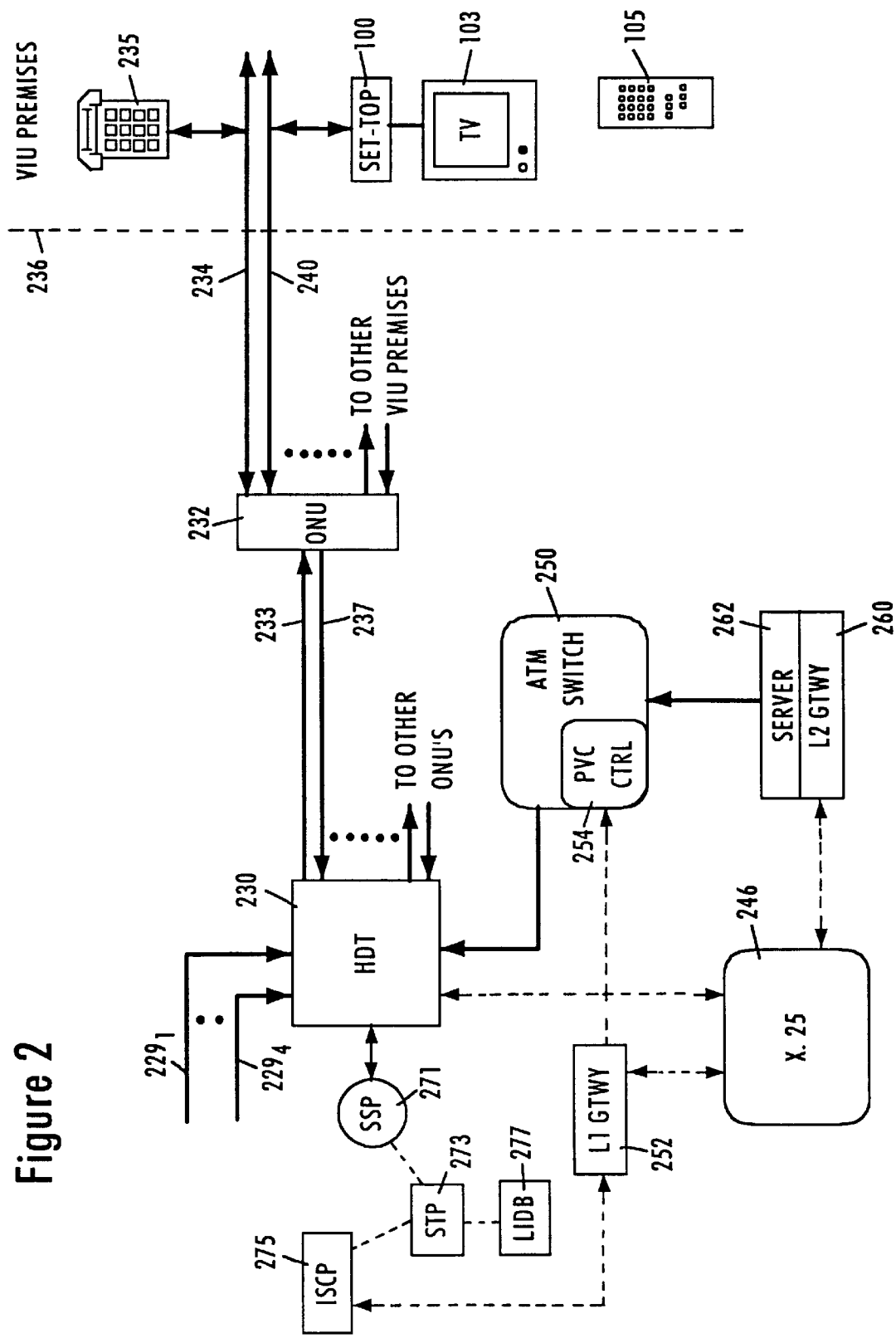
FIG. 2 is an illustration of an exemplary embodiment of a full service network providing broadband video service and having a set-top terminal for interacting with the ISCP of the AIN network.

FIG. 2 illustrates a preferred architecture for a full service network providing transport for broadband services, including broadcast video and IMTV type services such as video on demand, and implementing ISCP capabilities for the broadband services such as the method described above.

An ATM backbone network includes four optical fibers $229_1$ to $229_4$ carrying broadcast programming from an ATM edge device (not shown) to a large number of host digital terminals (HDT's) 230 (only one of which is shown in FIG. 2). The ATM edge device may comprise a relatively small capacity ATM switch. A more detailed description of the ATM edge device and its operation is disclosed in commonly assigned U.S. Pat. application Ser. No. 08/380,744 filed Jan. 31, 1995 entitled "Full Service Network Using Asynchronous Transfer Mode Multiplexing" (attorney docket no. 680-109), the disclosure of which is incorporated herein in its entirety by reference. Each optical fiber 229 carries 16 bit interleaved DS3 rate bit streams. Each DS3 rate stream contains 6 time division multiplexed ATM virtual circuits. Each virtual circuit carries 6 Mbits/s of digitized and compressed programming, e.g. encoded in MPEG II form and adapted for ATM cell transport.

The ATM backbone network includes at least one ATM switch 250 controlled by a PVC controller 254. A subscriber wishing to initiate an interactive broadband communication session interacts with a level 1 gateway 252 which in turn communicates with the PVC controller 254 to obtain the requisite bandwidth through the switch 250.

Each video information user (VIU) premises 236 is pre-assigned three DS3 slots on the downstream fiber from the HDT 230 to the ONU 232 for broadband service. Each home or living unit 236 is preferably allocated a capacity of four set-top terminal devices 100, with three being active at any one time. A coaxial drop 240 for each premises 236 carries 180 Mbits/s baseband digital data, which will simultaneously transport three 45 Mbits/s DS3 bit streams. For a particular VIU premises 236, the three DS3 channels on the fiber from the HDT 230 to the ONU 232 and on the drop cable 240 are individually assignable to different set-tops 100 within the subscriber's premises 236. The HDT 230 performs a switching type functionality to route a DS3 carrying a selected program from the fibers 229 or the fiber from the ATM switch 250 to each DS3 on the downstream fiber 233 assigned to a set-top 100. The ONU 232 performs optical to electrical conversion, separates out the DS3's received over the downstream optical fiber 233 from the HDT 230 and supplies the selected DS3 bit streams to appropriate channels on the coaxial cables 240 going to the respective subscriber premises 236.

The local loop network consists of the HDT 230, two-way optical fiber pairs 233, 237 between the HDT 230 and optical network units 232 (ONU's), and coaxial cables 240 and twisted wire pairs 234 connecting the ONU's to the subscriber premises equipment. In addition to broadband, the network illustrated in FIG. 2 will also provide narrowband transport for voice and narrowband data services. A digital switch or an analog implementation of an SSP switch 271 provides standard type plain old telephone service (POTS) for customers of the Full Service Network. The digital POTS switch provides a DS1 type digital input/output port through interfaces conforming to either TR008 or TR303. The DS1 goes to the HDT 230. The DS1 may go through a digital cross-connect switch (DCS) for routing to the various HDT's or directly to a multiplexer (not shown) serving a particular HDT 230. The multiplexer may also receive telephone signals in DS1 format from an analog switch through a central office terminal. The central office terminal converts analog signals to digital and digital signals to analog as necessary to allow communication between the analog switch and the rest of the network.

Although not shown, the telephone service multiplexer for an HDT 230 may multiplex a number of DS1 signals for transmission over one fiber of an optical fiber pair to the HDT 230 and demultiplex signals received over the other fiber of the fiber pair. The fiber pairs between the HDT 230 and the ONU's 232 will also have a number of DS1 channels to carry telephone and narrowband data signals to and from the subscriber's premises. In addition to the video services discussed above, the ONU 232 will provide telephone signals and appropriate power to the subscribers' premises over the twisted wire pairs 234 connected to subscribers' telephone sets 235.

Signaling communications between the set top 100 and the serving HDT 230 utilize a consumer electronics (CE) bus protocol. In the presently preferred embodiment, signaling communications between the other nodes of the network ride on an X.25 packet switched data network 246. In future implementations, instead of data network 246, the ATM switch 250 will carry the signaling traffic together with the IMTV broadband traffic.

In the illustrated embodiment, the downstream optical fiber 233 from the HDT 230 to each ONU 232 may use either an asynchronous optical protocol, or the synchronous (SONET) OC rate transport. The ONU's 232 provide appropriate interfacing between the voice channels on the fibers and twisted wire pair 234 for telephone service into the subscriber premises.

For narrowband signaling information, the ONU 232 passes all of the downstream signaling data received from the HDT 230 on fiber 233 through to all of the coaxial drop cables 240, so that for signaling data the cables look like a common bus shared by all of the connected set-tops. In the downstream direction, signaling packets are interleaved with the ATM cell stream packets. In the upstream direction, the signaling channel on the coaxial cable 240 is in a different frequency portion of the spectrum from the downstream DS3 transmissions. The ONU combines all of the upstream signaling packets from subscriber drop cables 240 into a digital data stream and transmits that data stream together with digitized upstream telephone service signals over the upstream fiber 237 to the HDT 230.

Each set-top 100 comprises a DET and NIM. In this embodiment, the NIM connects to the coaxial drop cable 240 to send control signals to the ONU 232 and receive video and data signals from the ONU 232. The NIM includes means to selectively demodulate received data from an assigned one of the three DS3 slots on the coax cable 240 and an ATM demux for mapping ATM cells from one ATM virtual circuit in that DS3 back into the corresponding MPEG packets. Specifically, the ATM demux captures and processes ATM cells bearing specified VPI/VCI header information corresponding to the selected program channel from the DS3 stream.

Each set-top 100 includes means to receive selection signals from a user via remote control, and as noted above, the set-top responds by transmitting appropriate data signals over a narrowband signaling channel on the coaxial drop cable to the ONU 240. According to the preferred embodiment, the narrowband signaling channel uses a consumer electronics (CE) bus protocol up to the HDT, and the HDT provides a protocol conversion for signaling communications via virtual circuits through X.25 network 246. With the CE bus protocol, for example, the active set-tops 100 are assigned signaling time slots by the HDT 230, and each active set-top 100 transmits channel selection data upstream to the ONU 232 in its assigned slot.

The ONU 232 multiplexes the data signals from the set-tops it services together and transmits those signals to the HDT 230 over an upstream channel on an optical fiber. If the data represents selection signals, the HDT responds to that data as outlined above, and stores data identifying each subscriber's selections for subsequent periodic uploading through the X.25 packet data communication network 246.

In operation, each time a subscriber turns on a set-top 100, the set-top transmits an appropriate signaling message upstream to the HDT 230. The HDT stores a table of valid equipment ID's for the set-tops it services. The signaling message transmitted to the HDT 230 at turn-on includes the equipment ID for the particular set-top 100. When the HDT 230 receives the initial signaling message from the set-top, the HDT executes a routine to initialize the set-top. As part of this initialization routine, the HDT 230 validates the set-top equipment ID and assigns one of the DS3 slots on the downstream fiber 233 to the ONU 232 to that set-top for as long as that set-top remains on. Also, one of the DS3's on the subscriber's coaxial drop cable 240 from the ONU 232 is assigned to the set-top 100 for the duration of communications.

At the same time, the HDT 230 will complete a two-way signaling communication link with the DET in the particular set-top 100. At least on the coaxial cable portion, the packets relating to the signaling link are identified by header information identifying the particular link, i.e. a signaling identifier assigned to this communication between the HDT 230 and the particular set-top 100. As part of the initialization routine, the HDT 230 sends one or more signaling messages to the DET in set-top 100 identifying the signaling channel assignment and the DS3 assignment. Specifically, for the signaling link, the HDT 230 assigns the next idle signaling ID to this call and informs the DET of that signaling ID assignment. The HDT 230 addresses downstream control messages to the set-top using the assigned signaling call ID.

When queried for status according to one embodiment of the present invention, the subscriber's set-top 100 provides a simple "off-hook" signal to the HDT 230 which indicates that the set-top is turned on. The HDT 230 sends the message through the X.25 packet switched network 246 to the Level 1 Gateway (L1 GTWY) 252. Once the initial message is accepted, an X.25 signalling link is provided between the HDT 230 and the Level 1 Gateway 252 for purposes of carrying signaling information between the set-top 100, the Gateway 252 and ISCP 275. The HDT 230 then internally associates that signaling call with the signaling call over the fibers 233, 237 and the coaxial cable 240, i.e. the signaling link set up from the HDT 230 through the ONU 232 to the set-top 100 when the user turned on the set-top terminal.

The set-top 100 may also send an initiation or 'hello' message to the Level 1 Gateway 252 that includes basic information including the set-top ID and a set-top type designation. This could be done, for example, in a modified set-top with passive features when the set-top was turned off when it was queried for status and was then later turned on. The Level 1 Gateway 252 can interact with the subscriber through the set-top 100 to obtain a selection. The Level 1 Gateway 252 receives a selection input from the set-top 100, e.g. in response to a menu display, within a predetermined period following the menu transmission. If the Level 1 Gateway 252 receives the selection input message from the set-top 100 within the predetermined period, the Level 1 Gateway 252 forwards the message to ISCP 275 for processing in accord with the present invention.

During broadband communications, the set-top 100 can transmit control signalling upstream through the ONU 232, the HDT 230, the X.25 data network and the Level 1 Gateway 252 to the ISCP 275. The ISCP 275 can also send signaling information, such as the GDI query in step S5 of one of the embodiments of the present invention queries and the calling party information, downstream through the same path to the DET 238. In a preferred embodiment of the method of the invention, the ISCP 275 sends calling name and number, obtained from LIDB 277, through Level 1 Gateway 252 to the HDT 230 and HDT 230 delivers the information to the settop box 100 for display on the bottom of the screen of television 103. The displayed information may be stationary or it may be scrolled across the screen during video events utilizing settop box 100. If the settop box is not being used, the information is not displayed.

The network preferably utilizes standardized interfaces for signalling messages between L1GW 252 and ISCP 275 in order to remove both complex processing and difficult to maintain data from the system requirements of a network element.

The Integrated Services Control Point (ISCP) currently manages six standardized network interfaces: AIN 0.0, AIN 0.1, IS 41 Rev A, IS 41 Rev B, 1129+, and GDI. Three other network interfaces may be implemented soon: AIN 0.2, Core INAP, and IS 41 Rev C. These or other interfaces are used to allow various existing and future video network elements to connect to the ISCP in order to off-load a portion of their system's processing and data requirements and provide additional ISCP managed service functionality for both the end customer and Video Information Provider (VIP).

Figure 6:
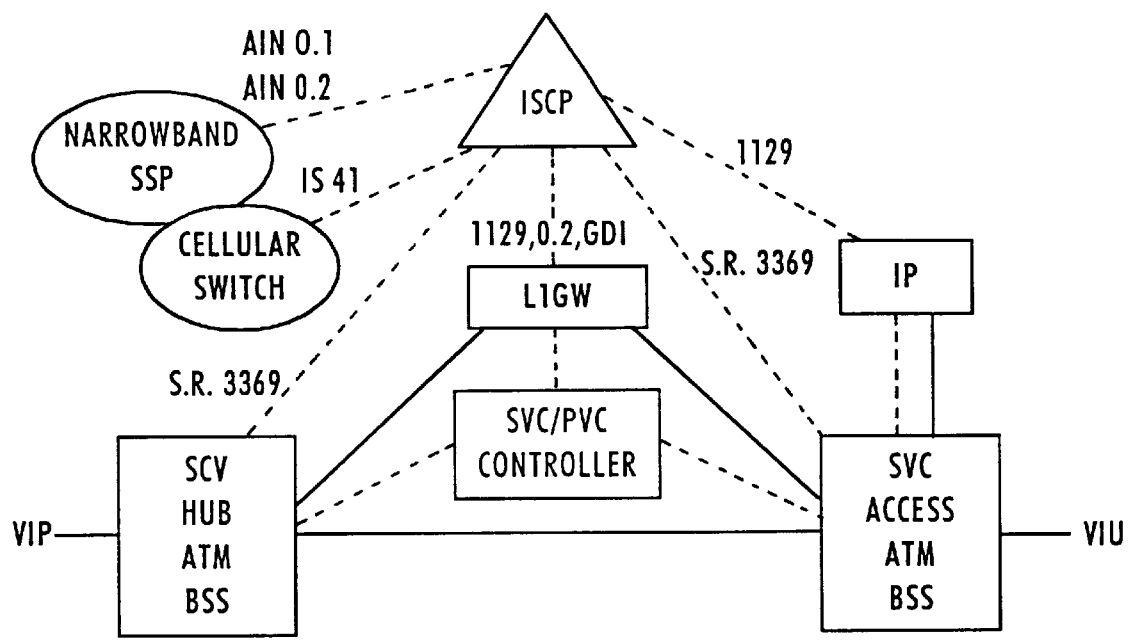
FIG. 6 is a block diagram showing various ISCP to broadband video network signaling interfaces.

FIG. 6 identifies various ISCP to video network signaling interfaces that might be available to different video components in order to provide different services. Most common are the AIN 0.1 and AIN 0.2 interfaces used to provide signalling between ISCP 15 and signal switching points of the narrowband public switched telephone network. The ISCP also supports an IS 41 interface to cellular switches, an 1129 interface to an intelligent peripheral and a S.R. 3369 interface to an ATM broadband switching system. The ISCP may interface with a SVC/PVC controller through a level 1 gateway using any one of the 1129, AIN 0.2 or GDI interfaces.

There are at least four different interface embodiments for video network element query access and interaction with the ISCP.

Figure 7:
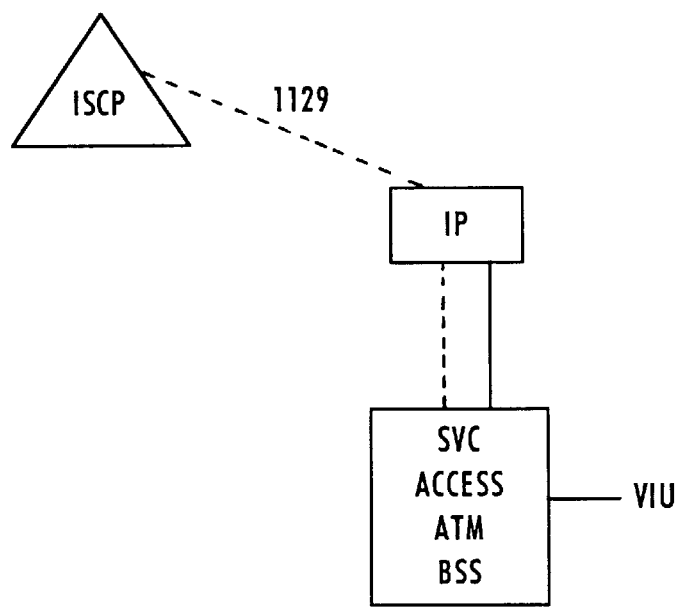
FIG. 7 is a block diagram showing a first ISCP to broadband video network signaling interface.

FIG. 7 illustrates the 1129+ Intelligent Peripheral (IP) Interface. In this embodiment, the broadband customer premises equipment connects directly to an Intelligent Peripheral (either prior to L1GW connection, or as a L2GW). Consequently, a VDT customer can use a remote control to directly interact with (and update) information residing on the ISCP or within an associated Operations Support System (OSS).

Figure 8:
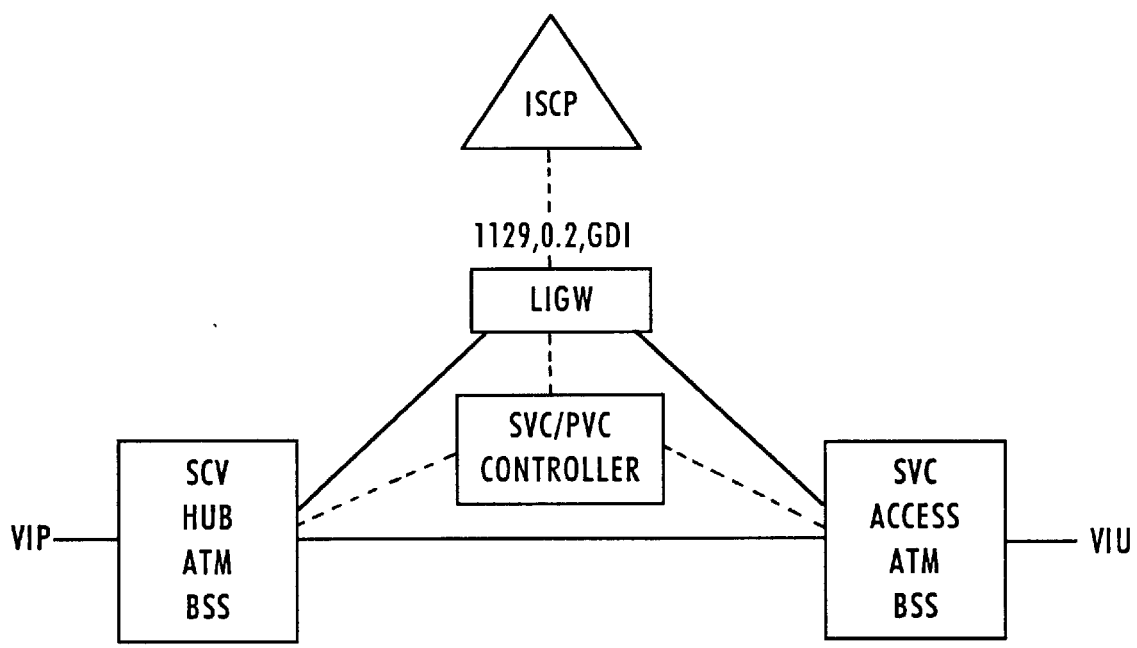
FIG. 8 is a block diagram showing a second ISCP to broadband video network signaling interface.

FIG. 8 shows a level 1 gateway (L1GW) which incorporates the capability to initiate an ISCP Query. The L1GW interacts with the customer and a variety of service information must be managed in order to successfully process the customer's transaction. Instead of creating the necessary process and data management functions on the L1GW, this embodiment has the L1GW query the ISCP. The ISCP then uses its existing capabilities to complete the transaction.

Figure 9:
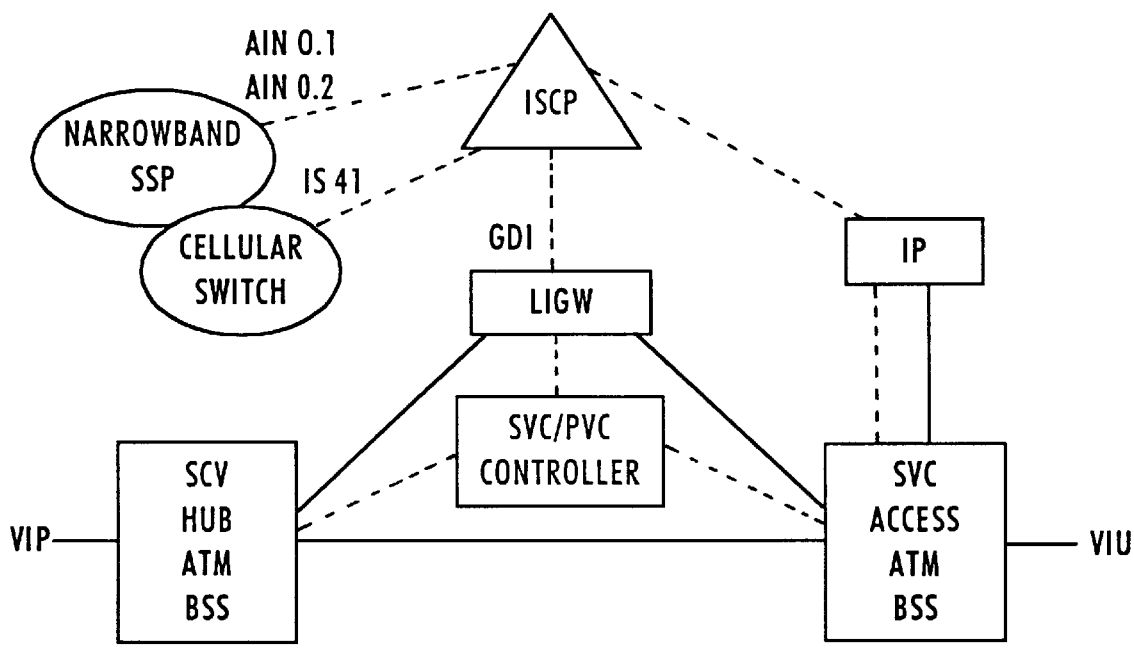
FIG. 9 is a block diagram showing a third ISCP to broadband video network signaling interface.

FIG. 9 shows the L1GW accepting ISCP initiated queries based on narrowband or cellular Activity. In this embodiment, video dial-tone services can be developed which are invoked based on traffic originating on the narrowband or cellular networks. Since narrowband and cellular switches are able to issue queries to the ISCP, subsequent queries must then originate from the ISCP and arrive at the L1GW. When a query reaches the L1GW, service delivery software code is then invoked to provide a value added service to the customer.

Figure 10:
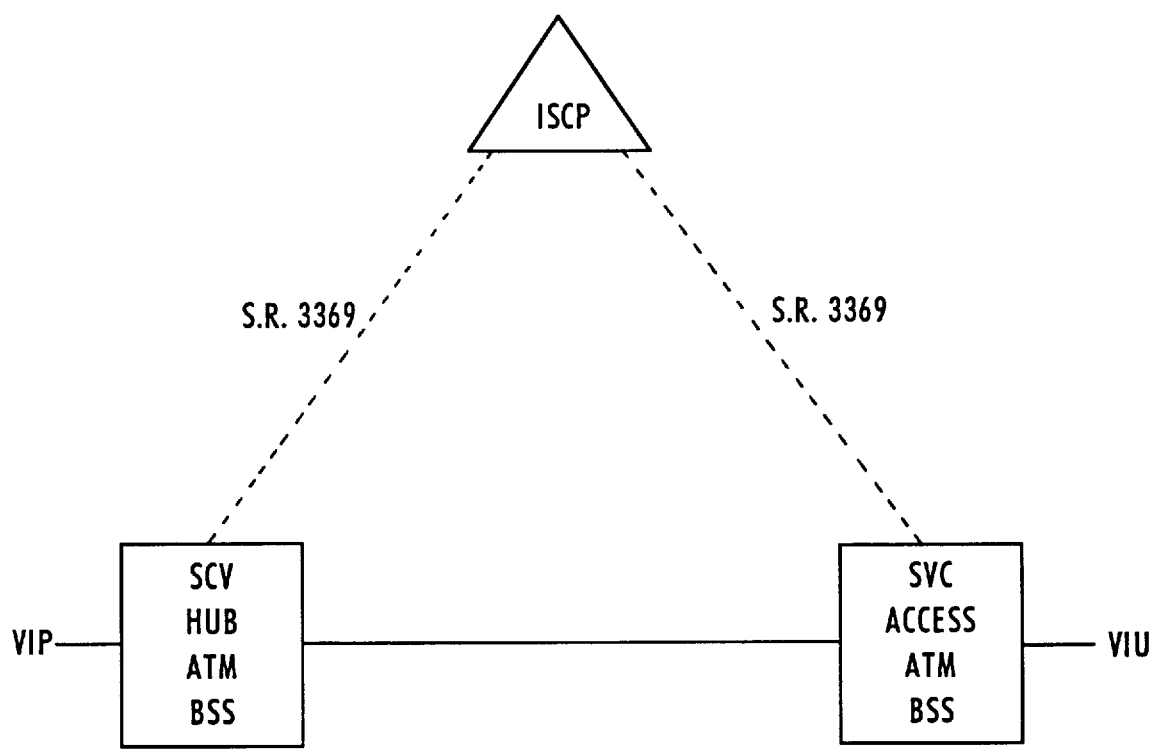
FIG. 10 is a block diagram showing a fourth ISCP to broadband video network signaling interface.

FIG. 10 shows an ATM Switch-Broadband Switching System (BSS) Interface which uses a standard AIN interface between the ATM switching fabric and the ISCP. The BBS interface may be the existing Bellcore defined interface known as S.R. 3369 (which closely matches the AIN 0.2 Interface specification) or any other present or future interface. The ISCP in such an environment could potentially provide direct person-to-person "video call" type services.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

We claim:

1. A method for handling an incoming narrowband communication to a narrowband terminal at customer premises, which premises include broadband video equipment having a video display in an integrated communication system, which includes:

a narrowband network for narrowband communications between calling and called narrowband terminals, said narrowband network having at least one signal switching point (SSP) for detecting a narrowband call from a calling narrowband terminal to said narrowband terminal as a called narrowband terminal, and a calling number corresponding to said calling narrowband terminal;

a broadband network connected to said broadband video equipment having a video display;

a services control point (SCP), integrated with said narrowband network and said broadband network and operative to perform network service logic programs for routing narrowband communications in said narrowband network, said method comprising the steps of:

detecting in said signal switching point (SSP) the incoming narrowband call from said calling narrowband terminal for said called narrowband terminal;

sending a first query to the SCP;

in response to said first query initiating a second query to said broadband video network to determine whether said customer is receiving a video event;

if said customer is receiving a video event, displaying calling party information on said video display; and processing said incoming narrowband call.

2. The method according to claim 1, wherein said step of sending a first query comprises sending a query to said services control point (SCP) with the calling number of the incoming narrowband call when the narrowband call is received by said signal switching point (SSP).

3. The method according to claim 2 wherein said services control point (SCP) performs said step of initiating said second query.

4. The method according to claim 2, wherein said services control point (SCP) performs said step of initiating said second query by sending said second query to an addressable control unit included in said customer premises wideband video equipment.

5. The method according to claim 4, wherein said services control point (SCP) sends said calling terminal information to said addressable control unit responsive to said addressable control unit responding to said second query by indicating that it is turned on.

6. The method according to claim 5, wherein said services control point (SCP) sends said calling terminal information to said addressable control unit when said control unit responds to said second query by indicating that said customer premises broadband video equipment is receiving a video event.

7. The method according to claim 4, wherein said addressable control unit formats said calling terminal information into a textual message and sends said textual message to said video display.

8. The method according to claim 5, wherein said method comprises the further step of sending a message from said services control point (SCP) to said signal switching point (SSP) in said narrowband network after said addressable control unit responds to said second query by indicating that it is turned on.

9. The method according to claim 1, wherein said calling terminal information is displayed before said incoming narrowband call is connected.

10. The method according to claim 1, wherein said signal switching point (SSP) detects the calling number using automatic number identification (AIN).

11. An integrated communication system, for serving at least one customer premises which includes a narrowband terminal and broadband video equipment having a video display, said integrated communication system including:

a narrowband network for narrowband communications between calling and called narrowband terminals, said narrowband network having at least one signal switching point (SSP) for detecting a narrowband call from a calling narrowband terminal to said narrowband terminal as a called narrowband terminal, and a calling number corresponding to said calling narrowband terminal;

a broadband network connected to said broadband video equipment having a video display;

a services control point (SCP), integrated with said narrowband network and said broadband network and operative to perform network service logic programs for routing narrowband communications in said narrowband network;

wherein at least one of said network service logic programs responsive to a first query from said switching signal point (SSP) initiates a second query to said broadband video network to determine whether said customer is receiving a video event, and if said customer is receiving a video event, initiates a data transaction to send data to the broadband network, the data including calling terminal information, which calling terminal information is displayed on said video display; and said narrowband call is processed.

12. A system according to claim 11 wherein said narrowband call is connected to said narrowband terminal subsequent to said video display.

13. A system according to claim 12 wherein said narrowband call is connected to said called narrowband terminal responsive to a signal from said customer premises following said video display.

14. A system according to claim 11 wherein said calling terminal information is stored in a line identification database (LIDB) and wherein at least one of said network service logic programs contains instructions instructing the services control point (SCP) to directly query said line identification database (LIDB) to obtain said calling terminal information based on the calling number and initiating the data transaction when the line identification database (LIDB) responds to the query with the calling terminal information.

15. A system according to claim 11 wherein said customer premises video equipment further comprises an addressable control unit.

16. A system according to claim 15 wherein said addressable control unit is interfaced to said services control point (SCP).

17. A system according to claim 16 wherein said interface between said addressable control unit and said services control point (SCP) comprises software resident in said addressable control unit.

18. A system according to claim 11 wherein said signal switching point (SSP) detects a trigger event on the narrowband call.

19. A system according to claim 18, wherein the trigger event comprises a terminating trigger event.

* * * * *